United States Patent
Rau

[11] 3,902,885
[45] Sept. 2, 1975

[54] APPARATUS FOR MAKING HOLLOW CYLINDERS OF VITREOUS SILICA

[75] Inventor: Karlheinz Rau, Hanau am Main, Germany

[73] Assignee: Heraeus-Schott Quarzschmelze GmbH, Hanau am Main, Germany

[22] Filed: July 22, 1974

[21] Appl. No.: 490,829

Related U.S. Application Data

[62] Division of Ser. No. 424,240, Dec. 12, 1973, Pat. No. 3,853,520.

[30] Foreign Application Priority Data

Dec. 27, 1972 Germany.......................... 2263589

[52] U.S. Cl.............................. 65/302; 65/DIG. 4
[51] Int. Cl.².................................... C03B 19/04
[58] Field of Search............ 65/32, 302, 18, DIG. 4, 65/DIG. 8, 157

[56] References Cited
UNITED STATES PATENTS

| | | | |
|---|---|---|---|
| 2,543,303 | 2/1951 | Rubissow | 65/302 X |
| 2,826,869 | 3/1958 | Lerch | 65/302 X |
| 3,226,465 | 12/1965 | Dowing et al. | 65/DIG. 4 |
| 3,652,245 | 3/1972 | Jung | 65/DIG. 4 |
| 3,837,825 | 9/1974 | Loxley et al. | 65/32 X |

*Primary Examiner*—S. Leon Bashore
*Assistant Examiner*—Frank W. Miga
*Attorney, Agent, or Firm*—Burgess, Dinklage & Sprung

[57] ABSTRACT

Hollow cylinders and tubes are made from vitreous silica by placing granular or powdered quartz or silica starting material on a granular bedding layer in a hollow form revolving about its axis and, as the rotation of the hollow form continues, melting by means of an electrical power source, and solidifying the starting material. An electrically heated hollow cylinder of carbonaceous material is disposed in the hollow form and the apertures thereof are hermetically closed with covers after the starting material has been put in. The sealed inner chamber thus formed is slowly evacuated with a vacuum to a pressure ranging from 10 to 0.0001 mm Hg. The starting material is slowly heated to the melting point while sustaining this pressure. After complete melting, the electric power source is shut off and the fused article is cooled while rotation continues. Thereafter, the vacuum pump is shut off and the inner chamber is aired before removing the cover. Lastly, the vitreous silica hollow cylinder which is still at temperatures between room temperature and 1400°C., is removed from the hollow form.

Apparatus for making hollow cylinders from vitreous silica via the above-described process includes horizontally disposed, rotatable hollow form means adapted to be hermetically sealed with a cover means having a vacuum connection connected to vacuum means. Crucible means are positioned within the form means and a graphite vacuum baffle means extends into the hollow form means and the crucible means. A filling of refractory thermal insulation material is between the crucible means and the hollow form means.

5 Claims, 1 Drawing Figure

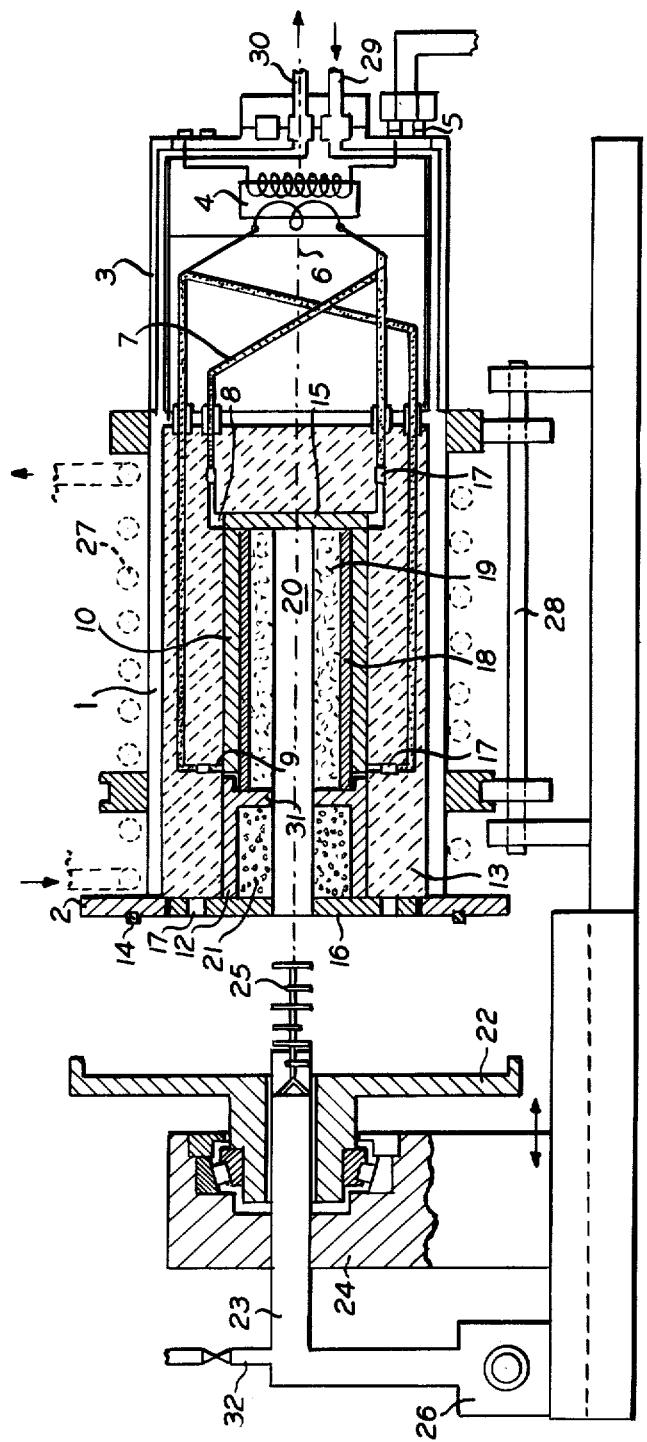

APPARATUS FOR MAKING HOLLOW CYLINDERS OF VITREOUS SILICA

This is a division, of application Ser. No. 424,240, filed Dec. 12, 1973 now U.S. Pat. No. 3,853,520, issued Dec. 19, 1974.

BACKGROUND

The invention relates to a method of making hollow cylinders, especially tubes, of vitreous silica, in which quartz or $SiO_2$ in granulated or powder form is used as starting material.

German Pat. No. 543,957 discloses a method of making tubes and other hollow bodies of vitreous silica, in which granulated quartz or quartz powder is placed on a bed of crushed carbon or graphite in a hollow form rotating about its axis and, while the rotation of the hollow form continues, is melted by means of an electrical energy source and then is allowed to solidify. The quartz granules are melted by an energy source located in the interior of the hollow form.

The vitreous silica tubes thus obtained contain bubbles in the mass, it being possible to diminish the bubble content to some extent, either by putting in the quartz granules periodically and fusing the thin layers that form and repeating this process the number of times required according to the desired thickness of the vitreous silica tube, or by sprinkling in the quartz granules continuously during the heating.

German Auslegeschrift No. 1,100,887 describes a method of making tubes from vitreous silica, in which the quartz granules are melted in a high-frequency vacuum induction furnace. The quartz granules are melted in a vertically disposed crucible whose inner wall consists of a series of nested graphite tubes which taper downward slightly and whose circumference contains holes.

By the action of the vacuum the impurities are removed which emerge from these holes during the heating of the quartz granules. The furance is first operated at full power, so that a temperature of 375°C. is rapidly attained, and then it is heated more slowly up to the melting temperature of the quartz. At high temperatures a chemical reaction takes place between the quartz and the graphite.

The fused piece thus obtained is then immediately drawn to a tube by the crucible drawing method using a mandrel and a drawing nozzle. Elongated hollow cylinders can be made on an economical and technical basis only with great effort. A charge weight of 7 kg. of granulated quartz is mentioned in the specification. The depth of the granulated quartz is reduced during the melting to about 60% of the original depth, so that the quartz in this process has to move over relatively great distances.

In the meantime, friction with the walls and wall erosion and adhesion, among other things, so greatly interfere with the steady movement of the quartz that this melting method of the prior art produces a very inhomogeneous vitreous silica. The inhomogeneity in the resultant solid, short blocks (or blanks) is so great that only a crucible drawing process using a mandrel and a drawing nozzle can be used for drawing out the blocks.

SUMMARY

The invention is addressed to the problem of manufacturing hollow cylinders, especially tubes, from vitreous silica, which will be substantially bubble-free and free of inhomogeneities, and in which the vitreous silica will be free of OH regardless of the OH content of the starting material, and will have a transformation point about 1075°C., i.e., will be thermally hard.

This problem is solved in accordance with the invention in that an electrically heatable hollow cylinder of carbonaceous material is disposed in the hollow form, the apertures of the hollow form are hermetically seald with covers after the starting material has been put into it, then the sealed internal chamber thus formed is slowly evacuated with a vacuum pump to a pressure ranging from about 10 to 0.0001 mm Hg, the starting material is slowly heated to the melting point while this pressure is sustained, the electrical energy source is shut off after complete melting is achieved, the fused cylinder or tube is cooled with continued rotation of the hollow form, the vacuum pump is shut off before removal of the covers and the internal chamber is aired, and then the vitreous silica hollow cylinder or tube, as the case may be, which still has a temperature between room temperature and 1400°C., is removed from the hollow form.

And it has been found that it is desirable to heat the starting material from the inner surface of the hollow form towards its axis of rotation. In this manner the advantage is obtained that gases which form can migrate towards the axis of rotation to be removed by pumping.

In the event of gassing during the heating process the heating power is reduced and is not restored to its normal level until the pressure rise has been eliminated and the specified vacuum has been reattained. The pumping rate and the heating rate are kept low in the process of the invention to prevent disturbing the uniform layer of granular or powdered starting material on the bed by the turbulence of emerging gases, and thus to preclude inhomogeneities in the vitreous silica hollow cylinder or tube.

It has proven to be very advantageous to retard the heating rate additionally just below the melting point of the starting material. This will not only prevent undesirable overheating, but will also give the material sufficient time to interact with the carbon monoxide, carbon dioxide and/or carbon vapor containing atmosphere within the inner chamber of the hollow mold. A vitreous silica hollow cylinder or tube is obtained which is free of OH and is thermally hard.

DESCRIPTION OF THE DRAWINGS

The accompanying drawing is a vertical cross-sectional view of preferred apparatus of the invention for carrying out the process thereof.

DESCRIPTION

It has proven to be advantageous to blow an inert gas, such as nitrogen, into the inner chamber of the hollow form before the cover is removed, so as to cool it more rapidly.

If any particles of the granular carbonaceous or ceramic bedding material (which must not melt or sinter, and which serve to facilitate separation of the molded article and the hollow cylinder) are adhering to the outer surface of the vitreous silica hollow cylinder or tube, they are rubbed off after the latter has cooled; then after any necessary mechanical treatment of this outer surface, the fused quartz hollow cylinder or tube is drawn, in a conventional drawing apparatus, into a thin-walled tube. The use of a drawing mandrel may be eliminated on account of the homogeneity of the vitreous silica hollow cylinder or tube melted by the method of the invention.

The method of the invention is not limited to vitreous silica hollow cylinders or tubes of small dimensions. The length of the vitreous silica hollow cylinder or tube depends only on the length of the hollow form; its wall thickness depends only on the thickness of the layer of starting material applied to the bedding. Homogeneous, OH-free and thermally hard vitreous silica hollow cylinders or tubes having a weight up to 100 kg and more may be made by the method of the invention without great difficulty.

An apparatus for the practice of the method of the invention is represented by way of example in the drawing. Advantageous features of the apparatus may be seen in the following description, which also includes the making of a fused silica hollow cylinder or tube.

The elongated, horizontally disposed, pot-shaped, hollow form 1 of metal has at its open end a flange 2 with a sealing ring 14. This hollow form rests upon a schematically indicated roller support 28.

The hollow form may be constructed with or without a cooling system; in the former case it is preferably given a double-walled construction so that a coolant such as water may be passed through it, connections 29 and 30 being provided for this purpose.

Within the hollow form there is disposed a crucible of graphite or carbon compound composed of the hollow cylindrical portion 10 and the bottom plate 15. A graphite pot 12 is horizontally disposed opposite the mouth of the crucible, its vertically disposed bottom 31 having in its center a circular aperture of such size that the width of the remaining bottom collar will correspond at least to the sum of the bulk depths of the bedding layer 18 and the layer of the starting material 19 which are placed in the crucible.

The space between the crucible 10, 15, and the hollow form 1 and between the graphite pot 12 and the hollow form 1 is filled with a refractory thermal insulation material 13, such as carbon or graphite granules, carbon fibers or ceramic insulation material.

On the bottom of the hollow form there are mounting means 3 for holding a heavy current transformer 4 whose primary coil is supplied with electrical energy through a slip-ring system 5. Conductors 7 are brought from the secondary side of the transformer 4 through the bottom of the hollow form 1 in a hermetically sealed and electrically insulated manner to the terminals 8 and 9 at the bottom 15 and the lip of the crucible.

In the end plate 16, which advantageously forms a single (integral) unit with the graphite pot 12, and in the terminals 8 and 9, bores or passages 17 are provided which permit the evacuation of the chamber filled with the thermal insulating material 13.

In front of the mouth of the hollow form 1 a rotatably mounted cover 22 is disposed on a supporting member 24 which is displaceable horizontally in the direction of the hollow form. Through this cover passes a stationary vacuum conduit 23 which is connected to a schematically represented vacuum 26.

At the end of the vacuum conduit 23 adjacent the hollow form 1 there is provided a vacuum baffle 25 of graphite, which during the melting process extends into the graphite pot 12 so far that its forward end does not extend beyond the surface of the bottom collar of the graphite pot 12 which faces the crucible 10, 15.

In another embodiment of the apparatus for the performance of the process, a stationary heavy-current transformer may be used as the power supply, which is joined on the heavy current side (secondary side) to the rotating hollow cylinder by means of a slip-ring system or a rotary connection using a fluid conductor.

Instead of resistance heating, induction heating may be used for performing the process of the invention. This is prepresented by broken lines in the drawing. In this case the transformer 4, the conductors 7 and the terminals 8 and 9 on the crucible 10, 15, are eliminated. The hollow form 1 is made of an electrically insulating material. It is surrounded by a tubular induction coil 27 through which a coolant can flow and which is supplied with high-frequency alternating current.

For special requirements, as for example the production of hollow cylinders of vitreous silica with one end closed, the apparatus represented in the drawing may also be mounted on a rotating system such that the axis of rotation, which at the same time is the axis of the vitreous silica hollow cylinder, will be vertically disposed.

With the apparatus represented in the drawing, the method of the invention is practiced as follows:

The hollow form 1 is placed in rotation about its long axis 6. All parts disposed within the hollow form rotate with it, because they are fixedly disposed therein. First a bedding material is placed in the crucible 10, 15, composed, for example, of carbon or graphite granules, so that a layer 18 uniformly covering the surface of the graphite cylinder 10 is formed. The thickness, that is, the bulk depth of this bedding layer 18 ranges preferably from 0.5 to 25 mm. It is advantageous to use a high-fired carbon or graphite material which has previously been thoroughly depressed.

The starting material is placed into the revolving hollow form so that a coating 19 is formed which uniformly covers the bedding layer 18. The speed of rotation of the hollow form is made to be so high that the centrifugal force will keep in place the bedding layer 18 and the coating 19 represented in the drawing. On the axis of the hollow form a passage 20 is formed. After a bulk insulation material such as pure translucent silica frits, sand, granulated scrap quartz, carbon or graphite granules 21 have been placed in the graphite pot 12, as shown, the supporting means 24 is brough forward and the hollow form is hermetically sealed with the cover 22, which revolves synchronously with the hollow form via roller bearings as shown.

Then a vacuum is produces slowly so that the bedding layer 18 and the raw material layer 18, as well as the insulating material 21, which are held in place only by centrifugal force, are not swept out by an excessively great turbulence of flow. By means of the vacuum pump 26 a pressure ranging from 10 to 0.0001 mm Hg is preferably sustained. If desired, this pressure may be maintained for a greater or lesser length of time without turning on the electrical heating power source, or the heating of the starting material may begin at once.

The rate of temperature rise is kept slow so that the temperature of the starting material will slowly allow enough time to pump out the vaporized impurities. When a temperature of about 1400° to 1500°C. is reached within the crucible 10, 15, the rate of temperature rise is reduced by reducing the input of electrical energy to, for example, 3°C. per minute. This diminishes the local temperature gradient in the layer 19 of starting material.

A reduction of the electrical power input is recommended especially if an unexpected overheating should occur due to an intensified production of reaction gases, which will be detected by the pressure measuring apparatus on on the vacuum pump and thus may easily be recognized.

After the starting material has all been melted, the electrical heating power is shut off so that the molten silica will slowly solidify. To prevent oxidation of the still very hot graphite parts it is recommendable to flood the inner chamber with an inert gas, nitrogen for example, through line 32, while continuing the rotation of the hollow form 1.

When the vitreous silica hollow cylinder or tube fused from the starting material has cooled to a temperature ranging from about room temperature to 1400°C., preferably to a temperature between 800° and 1200°C., the cover 22 is removed from the hollow form and the vitreous silica hollow cylinder or tube is removed from the hollow form, after the insulating material 21 has been shoveled out and the graphite pot 12 and end flange 16 have been removed.

Any particles of the bedding material that might be still clinging to the vitreous silica hollow cylinder or tube are rubbed off after cooling. Then the vitreous silica hollow cylinder or vitreous silica tube, as the case may be, may be further worked, preferably in a drawing apparatus, to form a thin-walled tube.

The advantageous properties of the vitreous silica hollow cylinders, and especially of the vitreous silica tubes made by the method of the invention, namely freedom from bubbles and freedom from inhomogeneities combined with freedom from OH, regardless of the starting material used, and the thermal hardness of the vitreous silica, are to be attributed to the fact that:

a. The heating up and melting of the starting material takes place in a vacuum in an atmosphere containing graphite or carbon;

b. the direction of the removal of developing vapors and gases is approximately the same as the direction in which the melt front advances; of c. the distances which each particle of starting material has to cover during the heat-up and melting are small in comparison to the dimensions of the melted vitreous silica hollow cylinder, because the melt front moves in the direction of the smallest dimension of the hollow cylinder being made (the outer surface of the hollow cylinder is the melt front; direction of melting is radially inwardly);

d. the direction of evacuation is in the direction of the minimum bulk depth of the starting material; and e. all of the starting material is heated and melted uniformly and slowly.

I claim:

1. Apparatus for making hollow cylinders from vitreous silica comprising horizontally disposed, rotatable hollow form means adapted to be hermetically sealed with cover means having a vacuum connection connected to vacuum means, crucible means positioned within said form means, graphite vacuum baffle means carried by said vacuum connection extending into the hollow form means and the crucible means, a filling of refractory thermal insulation material between the crucible means and the hollow form means, and electrical energy means connected to said crucible means.

2. Apparatus of claim 1 wherein the hollow form means comprises a double-walled metal structure having means for passing a coolant between said double walls.

3. Apparatus of claim 1 wherein the hollow form means comprises an electrically insulating material and tubular induction coil means through which coolant can flow surrounding said hollow form means.

4. Apparatus of claim 1 wherein the crucible means has an open end facing the cover means and is adapted to receive respective layers of bedding material and starting material therein, graphite pot means horizontally positioned in front of the open end of the crucible means, said pot means having a bottom with an aperture adjacent the open end of said crucible means, the remaining portion of said bottom being equal in radial width to at least the sum of the bulk depths of the bedding and starting materials in the crucible means.

5. Apparatus of claim 4 wherein the vacuum baffle means extends into the graphite pot means with its forward end not extending beyond the surface of the bottom of the graphite pot means that faces the crucible means.

* * * * *